(12) United States Patent
Hunter et al.

(10) Patent No.: US 9,747,582 B2
(45) Date of Patent: Aug. 29, 2017

(54) IMPLEMENTING A CONSISTENT ORDERING OF OPERATIONS IN COLLABORATIVE EDITING OF SHARED CONTENT ITEMS

(71) Applicant: Dropbox, Inc., San Francisco, CA (US)

(72) Inventors: Rian Hunter, San Francisco, CA (US); Alex Zhai, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 366 days.

(21) Appl. No.: 13/795,417

(22) Filed: Mar. 12, 2013

(65) Prior Publication Data
US 2014/0280463 A1    Sep. 18, 2014

(51) Int. Cl.
| | | |
|---|---|---|
| G06F 15/16 | (2006.01) | |
| G06Q 10/10 | (2012.01) | |
| G06F 17/22 | (2006.01) | |
| G06F 17/24 | (2006.01) | |
| H04L 29/06 | (2006.01) | |
| H04L 29/08 | (2006.01) | |

(52) U.S. Cl.
CPC ....... *G06Q 10/101* (2013.01); *G06F 17/2288* (2013.01); *G06F 17/24* (2013.01); *H04L 65/4015* (2013.01); *H04L 67/10* (2013.01)

(58) Field of Classification Search
CPC .... G06F 17/24; G06F 17/2288; G06F 3/0481; G06F 3/0483; G06F 3/0484; G06F 3/04842; G06F 9/526; H04L 65/403; H04L 12/1822; H04L 29/06027; H04L 29/06401; H04L 65/4015; H04L 65/601; H04L 67/10
See application file for complete search history.

(56) References Cited

U.S. PATENT DOCUMENTS

| | | |
|---|---|---|
| 6,260,042 B1 | 7/2001 | Curbera et al. |
| 7,899,883 B2 | 3/2011 | Rasmussen et al. |
| 8,244,046 B2 | 8/2012 | Takahashi et al. |
| 8,738,706 B1 * | 5/2014 | Grieve et al. ............ 709/205 |
| 2002/0083079 A1 | 6/2002 | Meier et al. |

(Continued)

OTHER PUBLICATIONS

NPL, Zach Smith, "Overview of Operational Transformation", UMM CSci Senior Seminar Conference, Apr. 2012.*

(Continued)

*Primary Examiner* — Padma Mundur
(74) *Attorney, Agent, or Firm* — Polsinelli PC (57) ABSTRACT

Systems, methods, and computer-readable storage media for ordering editing operations in collaborative editing of shared content items. The content management system can receive an edit operation from a first client for a content item that is shared for collaborative editing between the first client and a second client. In response to receiving the operation, the system can send an update to the first client including a previous operation received from the second client prior to receiving the operation from the first client, wherein the update can instruct the first client to perform a transform operation to transform a parameter of the operation according to an effect of the previous operation received from the second client. The system can then receive a result of the transform operation from the first client and update the shared content item based on the previous operation and the result of the transform operation.

18 Claims, 5 Drawing Sheets

(56) References Cited

U.S. PATENT DOCUMENTS

2006/0098899 A1    5/2006  King et al.
2007/0294612 A1    12/2007 Drucker et al.
2009/0006948 A1*   1/2009  Parker .................. G06F 3/0483
                                                           715/255
2011/0289405 A1    11/2011 Fritsch et al.

OTHER PUBLICATIONS

NPL, Zach Smith, "Overview of Operational Transformation," UMM CSci Senior Seminar Conference, Apr. 2012.*
Towards Collaborative Editing of Structure Data on Mobile Devices, Nicholas Palmer, Emilian Miron, Roelof Kemp, Thilo Kielmann, Henri Bal, Vrije Universiteit, Amsterdam, The Netherlands (6 pgs.).
Operational transformation from Wikipedia (12 pgs.).
U.S. Office Action dated Oct. 24, 2014, issued in related U.S. Appl. No. 13/801,303.
U.S. Notice of Allowance dated Apr. 13, 2015, issued in related U.S. Appl. No. 13/801,303.

* cited by examiner

IMPLEMENTING A CONSISTENT ORDERING OF OPERATIONS IN COLLABORATIVE EDITING OF SHARED CONTENT ITEMS

TECHNICAL FIELD

The present disclosure relates to collaborative editing and more specifically to ordering editing operations in collaborative editing of shared content items using a centralized server.

BACKGROUND

Collaborative systems allow documents to be created and edited online by collaborating users in real-time. A user can share a document with other users and the users can work together as a group in editing the document. Users can also edit the shared document concurrently. Further, each user can make changes to the shared document in a coordinated fashion. Each user can also view changes made to the shared document by other users in real-time. The collaborative system can also maintain consistency of the shared document even as the various users make changes to the document.

To create a collaborative working environment, the different clients in a collaborative system must share and negotiate their respective operational changes to a document. In some collaborative systems operational changes are shared and implemented by clients on a peer-to-peer basis. Here, the different clients in the collaborative system send their respective operations to each other. To maintain consistency, each client must consequently maintain an order of operations, including their respective operations and those of the other clients. This allows each client to determine when to apply each operation to avoid errors and inconsistencies in the data.

Each client can maintain an order of operations using a vector clock, which refers to an algorithm for generating an order of events in a distributed system, and detect causality violations. Specifically, each client can use its vector clock to calculate a respective order of operations from the perspective of the respective client. Because each client must maintain a separate order of operations, the current collaborative systems must, at some point, re-order all of the operations from the different clients. However, this requires additional operations, and places a great burden on the collaborative system. Moreover, the different ordering of operations at the clients constrains the flexibility of operations and capabilities of the collaborative system. As a result, users are limited in their collaborative experience.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following description and accompanying drawings, or can be learned by the practice of the principles set forth herein.

The approaches set forth herein can be used to implement a consistent model for ordering editing operations in a collaborative working environment. Here, the different clients in the collaborative working environment can maintain the same ordering of operations. The ordering of operations can be determined using a client-server model, which allows the server to determine the order and send the determined ordering to the clients. A consistent ordering of operations can provide a greater flexibility of operations and additional collaborative capabilities. Moreover, the consistent ordering of operations can greatly reduce the burden placed on the collaborative systems resulting from the various consistency operations.

Disclosed are systems, methods, and non-transitory computer-readable storage media for implementing a consistent ordering of client operations modifying a shared content item in a collaborative editing environment. The system can receive an operation from a first client, the operation can include an edit of a content item that is shared for collaborative editing between the first client and a second client. The network content item can be shared for real-time and/or concurrent viewing and editing between the first client and the second client. As used herein, concurrent can mean at the same time and/or at nearly the same time. An edit can include an operation for adding content, deleting content, formatting content, saving content, copying content, cutting content, organizing content, searching content, reviewing content, approving content, rejecting content, manipulating content, communicating content, performing an action, reversing an action, executing a function, and/or performing any other type of collaborative function. Additionally, a content item shared for collaborative editing can be of varying types, such as documents, images, video, audio, etc.

In response to receiving the operation, the system can send an update to the first client including a previous operation received from the second client prior to receiving the operation from the first client, wherein the update can instruct the first client to perform a transform operation to transform a parameter of the operation according to an effect of the previous operation received from the second client. The system can then receive a result of the transform operation from the first client and update the shared content item based on the previous operation and the result of the transform operation.

The operation and the previous operation can be performed concurrently by the first client and the second client. Moreover, the operation and the previous operation can be performed in real-time by the first client and the second client. Further, the system can store an ordered list of operations received from the first client and the second client, and generate the update based on the ordered list of operations. The system can also store an ordered list of operations received from the first client and the second client, and use the ordered list of operations to determine when a received operation must be transformed according to a respective transform operation. Also, the system can assign unique identifiers to the operations defining an ordering of the operations based on when an operation is received at the server in relation to other operations. The system can assign a unique identifier to all the operations, and generate an order of operations based on the different identifiers assigned to the operations. In this manner, the system can ensure that all of the clients maintain consistent lists of the operations performed on the content item.

In one embodiment, the system can receive operations from a set of clients. The operations can include collaborative edits of the shared content item. Based on an ordered list of operations received from the set of clients, the system can send updates to at least two clients from the set of clients. The updates can instruct the clients to perform respective transform operations. The system can also assign unique identifiers to the operations defining an ordering of the operations based on when an operation is received at the server in relation to other operations. Next, the system can receive results of the respective transform operations from the clients and update the shared content item based on the results of the respective transform operations.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The present disclosure provides a way to order operations in a synced online content management system. A system, method and computer-readable media are disclosed which implement a consistent order of operations in collaborative editing of shared content items.

Figure 1:
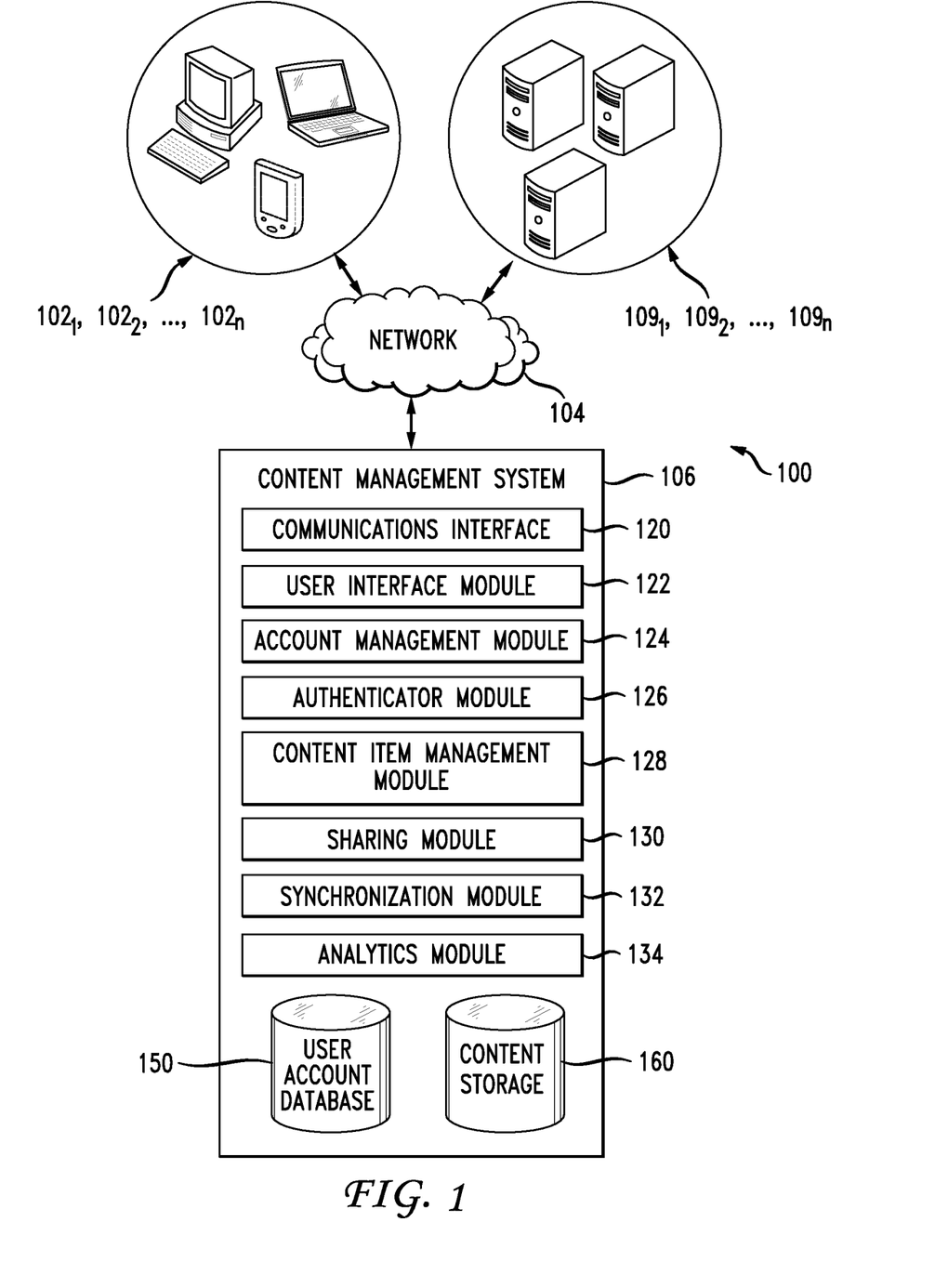
FIG. 1 shows an exemplary configuration of devices and a network in accordance with the invention.

An exemplary system configuration 100 is shown in FIG. 1, wherein electronic devices communicate via a network for purposes of exchanging content and other data. System 100 can be configured for use on a wide area network such as that shown in FIG. 1. However, the present principles are applicable to a wide variety of network configurations that facilitate the intercommunication of electronic devices, such as a local area network, wireless network, etc. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of independent disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible. For example, content management system 106 can include an edit management module.

The disclosure now turns to a technique for ordering editing operations in a synced online content management system that allows for a consistent order of the operations during collaborative editing of a shared content item, such as a document, image, video, audio or other file type. A person skilled in the art will recognize that while the disclosure frequently uses collaborative editing of a document to illustrate the technology, a content item can be of any file type that can be edited without parting from the spirit and scope of the disclosure. For example, the technology can be used to collaborative edit images. In this case, the operations would be edit operations relevant to the image file type.

Figure 2:
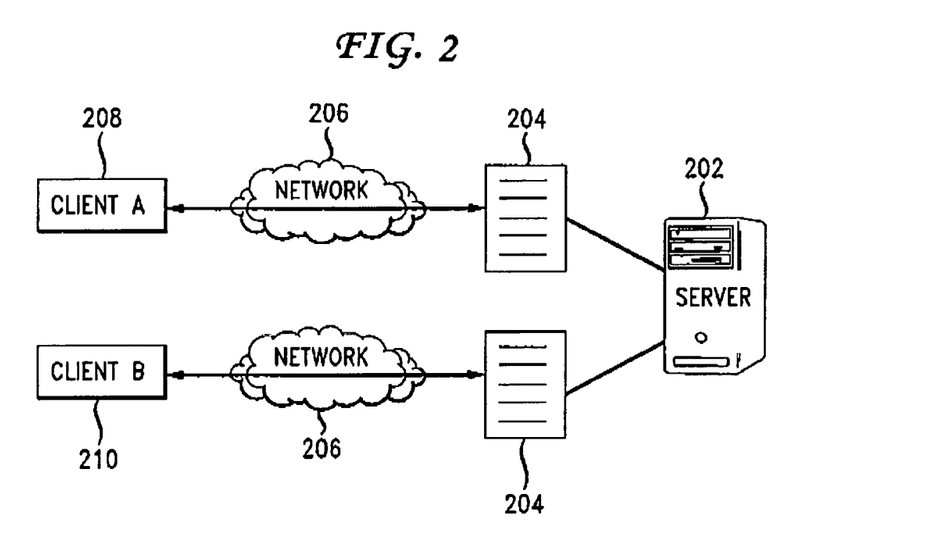
FIG. 2 shows an example of a client-server system for collaborative editing of a shared document.

FIG. 2 shows exemplary client-server system 200 for collaborative editing of a shared document. In client-server system 200, server 202 can be implemented by content management system 106 of FIG. 1 and client A 208 and client B 210 can each be implemented by one of client devices 102 of FIG. 1. Server 202 can provide access to client A 208 and client B 210 to edit collaboratively a shared content item 204 hosted by the content management system. Clients 208 and 210 can communicate with server 202 via a network 206. In this case, a platform-specific native or interpreted application can provide the interface for viewing and editing the shared content item, or clients 208 and 210 can access the shared content item via a web-based interface. In either case, clients 208 and 210 can each open a copy of the shared content item or access a server-hosted representation of the shared content item. A user can submit, through client A 208, a content item operation to server 202, such as an insert, delete, cut, paste, formatting change, undo, redo, or other modification to the shared content item. Server 202 can process the content item operation, updates the document operation if necessary, and transmit a confirmation of the content item operation to client A 208 and propagate the content item operation and ordering information for the content item operation to client B 210. In this way, each of the clients maintains a consistent ordering of changes in a document revision history, and subsequent changes to the shared document are more easily processed and kept consistent.

Figure 3:
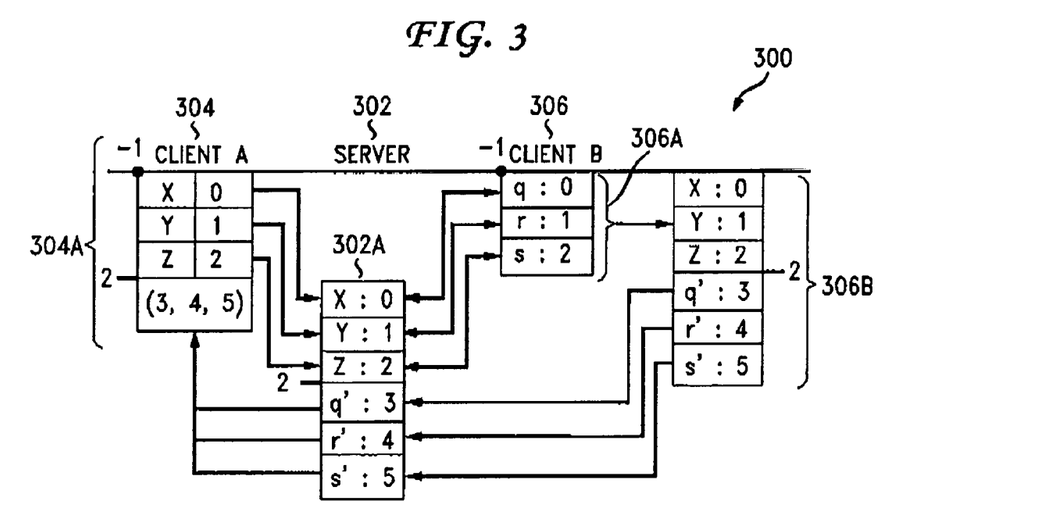
FIG. 3 shows an example of a system for ordering editing operations in collaborative editing of a shared document.

FIG. 3 shows an example of ordering editing operations in collaborative editing of a shared content item, such as a word processing document, using system 200. Client A 304 and client B 306 can communicate with server 302, such as content management system 106, for collaborative editing of a document 304. A copy of document 304 is stored as 304A in client A 304, and is also stored as 306A in client B 306. In this example, client A 304 submits three edits to document 304A, operations X, Y, and Z at positions 0, 1, and 2. Server 302 receives the three edits, which are the first edits submitted. Inasmuch as the three edits are first and the server has not received and is not processing any other pending edits, server 302 accepts the ordering of client A 304, and assigns them positions 0, 1, and 2 in server ordering of operations queue 302a. Server 302 transmits a confirmation to client A 304 and propagates the changes to client B 306. However, at some point prior to propagating changes to client B 306, client B 306 submits three edits to document 306A, operations Q, R, and S at positions 0, 1, and 2. Client B 306 assigns operations Q, R, and S these positions because it does not yet know that server 302 has assigned those positions to operations X, Y, and Z. Upon receiving the communication from client B 306, server 302 adjusts operations Q, R, S, to Q', R', and S' at 306B and assigns the new operations to positions 3, 4, and 5. Server 302 includes the effects of X, Y, and Z against Q to obtain Q', includes the effects of X, Y, Z, and Q' against R to obtain R', and includes the effects of X, Y, Z, Q', and R' against S to obtain S'. Q', R', and S' become the new changes. Then server 302 transmits to the client 306 an acknowledgement of the submitted edits 306, and instructions to update the edits to different positions, after X, Y, and Z. Client B 306 transforms these updated operations against X, Y, and Z. Server 302 also transmits Q', R', and S' to client A 304 for insertion at positions 3, 4, and 5. At the end of this process, server 302, client A 304, and client B 306 all have a consistent list of operations and a revision history for the collaboratively edited document. At this point, when either client A 304 or client B 306 submits an additional operation, that additional operation will be assigned to the next open position, or position 6.

The illustrated lists of operations 302A, 304A, 306A, 306B depict only an operation to perform and a position or order in which the operation is performed relative to the other operations. The lists of operations can include further information as well, such as a timestamp, metadata describing the client type that made the operation, a user name or account associated with the operation, an operation priority, or a collection of sub-operations that make up the operation. Each operation in the list of operations can be a single action or a chain of separate actions. For example, the insertion or deletion of a single character can count as a single operation at perhaps the most atomic level, all the way up to the insertion or deletion of an entire paragraph or more in the text. In one example, the system can combine an uninterrupted stream of individual operations from one client as a single operation until an interrupting operation is received from another client, at which time server 302 can break the stream of individual operations from the first client and process the interrupting operation and reorder operations and update the clients as necessary.

Server 302 can iteratively repeat this process as additional edits are submitted from clients. The same basic process can be extended to more than two clients, and as the number of communications between the server and the clients increases, the same basic principles of ordering and transforming operations can remain intact.

Figure 4:
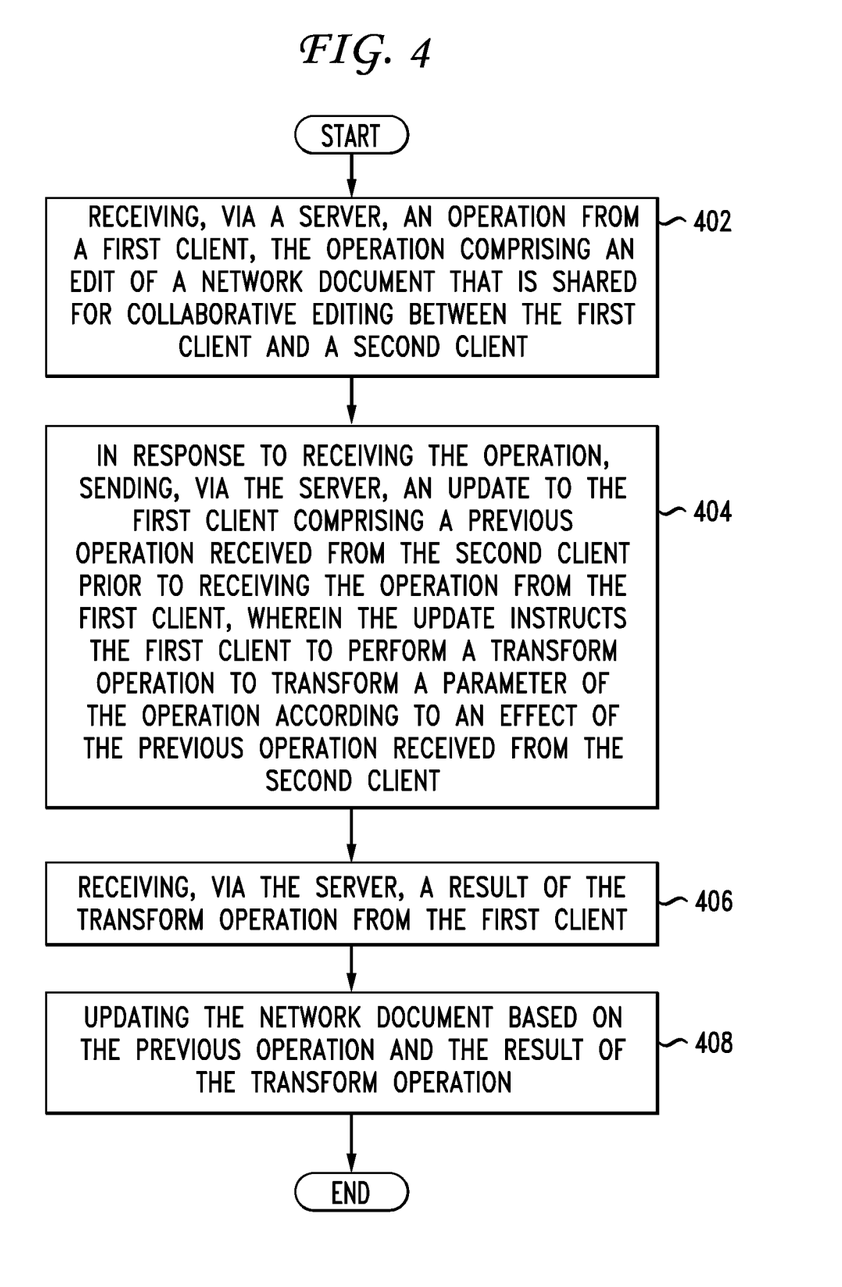
FIG. 4 shows an example method embodiment.

Having disclosed some basic system components and concepts, the disclosure now turns to the example method embodiment shown in FIG. 4. For the sake of clarity, the method is described with respect to exemplary content management system 106, as shown in FIG. 1, configured to practice the method. The steps outlined herein are illustrative and can be implemented in any combination thereof, including combinations that exclude, add, or modify certain steps.

Content management system 106 can receive an operation from a first client, the operation including an edit of a content item that is shared for collaborative editing between the first client and a second client (400). The content item can be shared for real-time and/or concurrent editing between the first client and the second client. As used herein, concurrent can mean at the same time and/or at nearly the same time. An edit can include an operation for adding content, deleting content, formatting content, saving content, copying content, cutting content, organizing content, searching content, reviewing content, approving content, rejecting content, manipulating content, communicating content, performing an action, reversing an action, executing a function, and/or performing any other type of collaborative function.

In response to receiving the operation, content management system 106 can send an update to the first client including a previous operation received from the second client prior to receiving the operation from the first client, wherein the update can instruct the first client to perform a transform operation to transform a parameter of the operation according to an effect of the previous operation received from the second client (402). Content management system 106 can then receive a result of the transform operation from the first client (404) and update the shared document based on the previous operation and the result of the transform operation (406).

The operation and the previous operation can be performed concurrently by the first client and the second client. Moreover, the operation and the previous operation can be performed in real-time by the first client and the second client. Further, content management system 106 can store an ordered list of operations received from the first client and the second client, and generate the update based on the ordered list of operations. Content management system 106 can also store an ordered list of operations received from the first client and the second client, and use the ordered list of operations to determine when a received operation must be transformed according to a respective transform operation. Also, content management system 106 can assign a unique identifiers to the operations defining an ordering of the operations based on when an operation is received at the server in relation to other operations. Content management system 106 can assign a respective unique identifier to all the operations, and generate an order of operations based on the different identifiers assigned to the operations.

In one embodiment, content management system 106 can receive operations from a set of clients. The operations can include collaborative edits of the shared content item. Based on an ordered list of operations received from the set of clients, content management system 106 can send updates to at least two of the clients in set of clients. The updates can instruct the clients to perform respective transform operations. Content management system 106 can also assign a respective unique identifier to the operations defining when the operations were received in relation to each other. Next, content management system 106 can receive results of the respective transform operations from the clients and update the shared document based on the results of the respective transform operations.

Figure 5A:
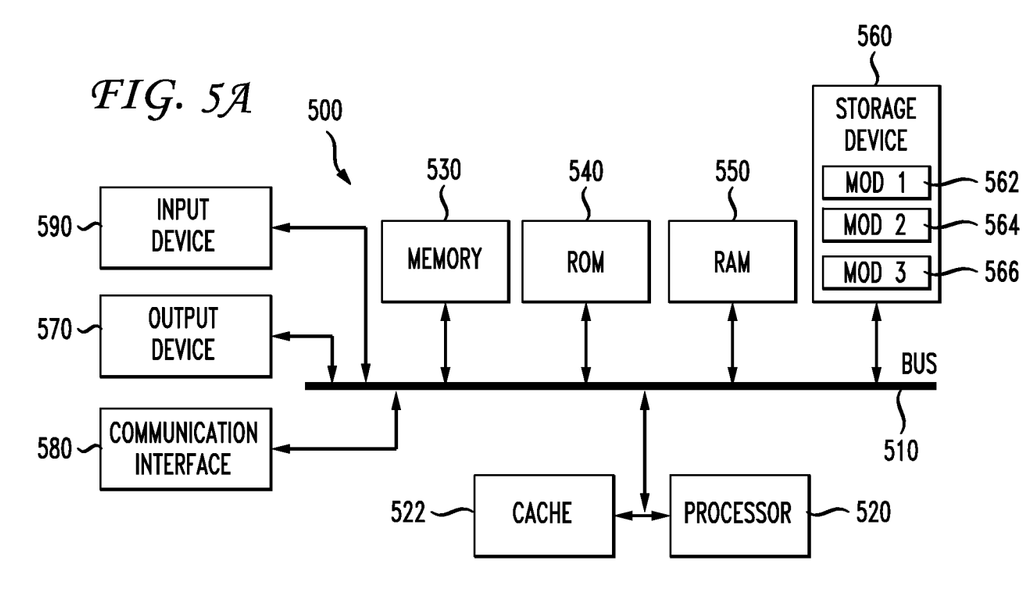
FIG. 5A shows a conventional system bus computing system architecture.
Figure 5B:
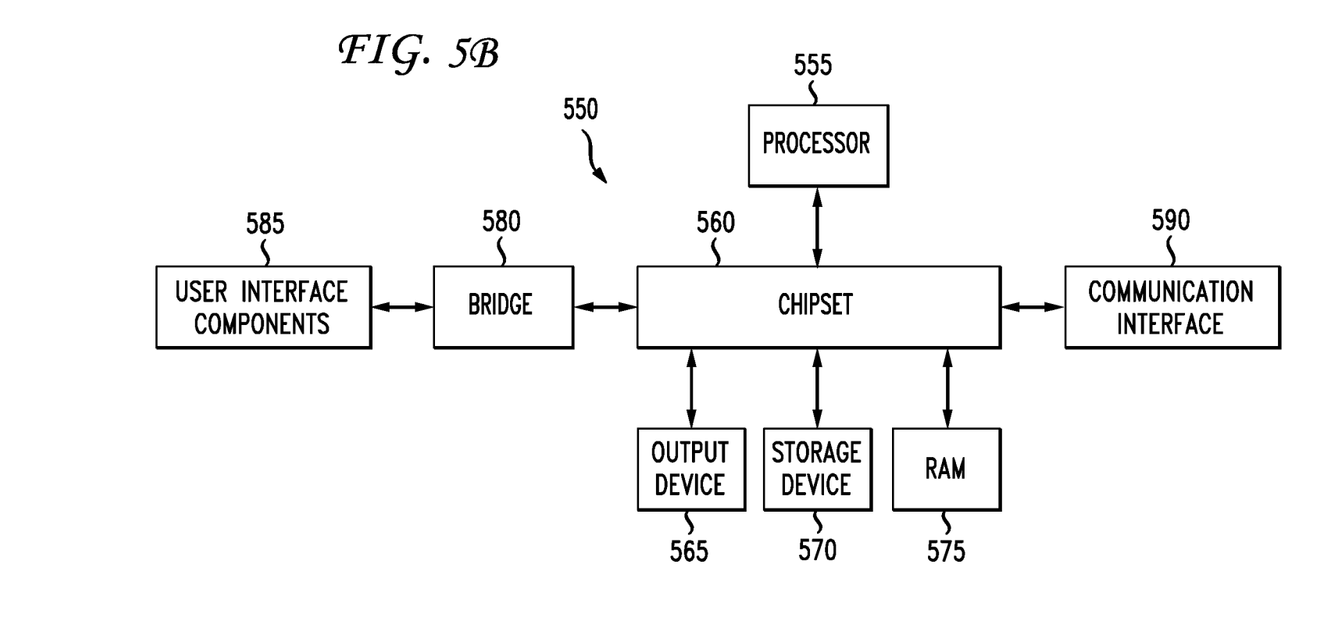
FIG. 5B shows a computer system having a chipset architecture.

FIG. 5A, and FIG. 5B show exemplary possible system embodiments. The more appropriate embodiment will be apparent to those of ordinary skill in the art when practicing the present technology. Persons of ordinary skill in the art will also readily appreciate that other system embodiments are possible.

FIG. 5A shows a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B shows a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving at a server of a synchronized content management system, edit operations from a plurality of clients, the edit operations comprising collaborative edits of a shared content item, the edit operations applying to the shared content item that is shared for concurrent collaborative editing between the plurality of clients including at least a first client and a second client, the edit operations having a corresponding position and a unique identifier associated with each edit operation, wherein a native application provides the plurality of clients with an interface for concurrent viewing and editing the shared content item, and wherein the synchronized content management system synchronizes changes to content items in a local folder on each of the plurality of clients and each of the plurality of clients queues changes to the content items for subsequent synchronization when network connectivity with the server is unavailable;
based on an ordered list of edit operations received concurrently from at least the first client and the second client of the plurality of clients, at the server of the synchronized content management system, generating updates to the plurality of clients, wherein the updates instruct the plurality of clients to perform respective transform operations;
wherein generating the updates to the plurality of clients based on receiving the edit operations from the first client concurrently with the second client at the server of the synchronized content management system, further comprises:
receiving, at the server of the synchronized content management system, data describing an edit operation from the first client, the edit operation applying to the shared content item that is shared for concurrent collaborative editing between the plurality of clients;
receiving, at the server of the synchronized content management system, data describing an edit operation occurring within the native application from the second client, the edit operation applying to the shared content item and having a corresponding position, the edit operation received from the second client is received concurrent with the edit operation from the first client and-prior to sending the edit operation from the first client to the second client;
adjusting, via the server of the synchronized content management system, the edit operation from the second client and assigning a new position to the edit operation from the second client;
sending, via the server of the synchronized content management system, the edit operation from the first client to the second client along with instructions to update the position for the edit operation from the second client and instructions to perform the respective transform operations based on the adjustment;
sending, via the server of the synchronized content management system, an update of the edit operation from the second client for insertion at the updated position to the first client and instructions to perform the respective transform operations based on the insertion; and
updating, via the server of the synchronized content management system, the ordered list of edit operations for the shared content item based on the edit operations and updates sent to the first client and the second client, wherein at the end of the updating, the ordered list of edit operations for the shared content item of the synchronized content management system matches the ordered list of edit operations for the shared content item maintained by each of the first client, the second client, and the server.

2. The method of claim 1, wherein the shared content item is shared for real-time editing between the first client and the second client.

3. The method of claim 1, wherein editing includes at least the ability to perform an action and reversing the action.

4. The method of claim 1, wherein the synchronized content management system stores the ordered list of the edit operations received from the first client and the second client.

5. The method of claim 1, wherein the synchronized content management system stores the ordered list of the edit operations received from the first client and the second client, and wherein the synchronized content management system uses the ordered list of the edit operations to determine when a received operation must be transformed according to a respective transform operation.

6. The method of claim 1, wherein the synchronized content management system assigns the unique identifiers to the edit operations to define an ordering of the edit operations based on when an edit operation is received at the synchronized content management system in relation to other edit operations.

7. The method of claim 1, further comprising:
receiving results of the respective transform operations; and
updating the shared content item based on the results of the respective transform operations.

8. A system comprising:
a processor; and
a non-transitory computer-readable storage medium having a synchronized content management system and having stored therein processor-executable instructions for causing the processor to:
receive at a server of the synchronized content management system, edit operations from a plurality of clients, the edit operations comprising collaborative edits of a shared content item, the edit operations applying to the shared content item that is shared for concurrent, collaborative editing between the plurality of clients including at least a first client and a second client, and wherein the synchronized content management system synchronizes changes to content items in a local folder on each of the plurality of clients and each of the plurality of client queues changes to the content items for subsequent synchronization when network connectivity with the server is unavailable;
based on an ordered list of edit operations received concurrently from at least the first client and the second client of the plurality of clients, at the server of the synchronized content management system, generate updates to the plurality of clients, wherein the updates instruct the plurality of clients to perform respective transform operations;

wherein generating the updates to the plurality of clients based on receiving the edit operations from the first client concurrently with the second client at the server of the synchronized content management system, further comprises:

receiving, via the server of the synchronized content management system, data describing an edit operation from the first client, the edit operation applying to the shared content item that is shared for concurrent, collaborative editing between the plurality of clients, the edit operation having a corresponding position and a unique identifier associated with each edit operation, wherein a native application provides the plurality of clients with an interface for concurrent viewing and editing the shared content item;

receiving, via the server of the synchronized content management system, data describing an edit operation occurring within the native application from the second client, the edit operation applying to the shared content item, and having a corresponding position, the edit operation received from the second client is received concurrent with the edit operation from the first client and prior to sending the edit operation from the first client to the second client;

adjusting, via the server of the synchronized content management system, the edit operation from the second client and assigning a new position to the edit operation from the second client;

sending, via the server of the synchronized content management system, the edit operation from the first client to the second client along with instructions to update the position for the edit operation from the second client and instructions to perform the respective transform operations based on the adjustment;

sending, via the server of the synchronized content management system, an update of the edit operation from the second client for insertion at the updated position to the first client and instructions to perform the respective transform operations based on the insertion;

updating, via the server of the synchronized content management system, the ordered list of edit operations for the shared content item based on the edit operations and updates sent to the first client and the second client, wherein at the end of the updating the ordered list of edit operations for the shared content item of the synchronized content management system matches the ordered list of edit operations for the shared content item maintained by each of the first client, the second client, and the server.

9. The system of claim 8, wherein the shared content item is shared for real-time editing between the first client and the second client, wherein editing includes at least the ability to perform an action and reversing the action.

10. The system of claim 8, wherein the synchronized content management system stores the ordered list of the edit operations received from the first and the second client.

11. The system of claim 8, wherein the synchronized content management system stores the ordered list of the edit operations received from the first and the second client, and wherein the processor uses the ordered list of the edit operations to determine when a received edit operation must be transformed according to a respective transform operation.

12. The system of claim 8, wherein the processor assigns the unique identifiers to the edit operations to define an ordering of the edit operations based on when an edit operation is received at the server in relation to other edit operations.

13. A non-transitory computer-readable storage medium having a synchronized content management system and having stored therein processor-executable instructions for causing a processor to:

receive at a server of the synchronized content management system, edit operations from a plurality of clients, the edit operations comprising collaborative edits of a shared content item, the edit operations applying to the shared content item that is shared for concurrent collaborative editing between the plurality of clients including at least a first client and a second client, wherein a native application provides the plurality of clients with an interface for concurrent viewing and editing the shared content item, and wherein the synchronized content management system synchronizes changes to content items in a local folder on each of the plurality of clients and each of the plurality of clients queues changes to the content items for subsequent synchronization when network connectivity with the server is unavailable;

based on an ordered list of edit operations received concurrently from at least the first client and the second client of the plurality of clients, at the server of the synchronized content management system, generate updates to the plurality of clients, wherein the updates instruct the plurality of clients to perform respective transform operations;

wherein generating the updates to the plurality of clients based on receiving the edit operations from the first client concurrently with the second client at the server of the synchronized content management system, further comprises:

receiving, via the server of the synchronized content management system, data describing an edit operation from the first client, the edit operation applying to the shared content item that is shared for concurrent, collaborative editing between the plurality of clients, the edit operation having a corresponding position and a unique identifier associated with each edit operation, wherein the native application provides the plurality of clients with an interface for concurrent viewing and editing the shared content item;

receiving, via the server of the synchronized content management system, data describing an edit operation occurring within the native application from the second client, the edit operation applying to the shared content item, and having a corresponding position, the edit operation received from the second client is received concurrent with the edit operation from the first client and prior to sending the edit operation from the first client to the second client;

adjusting, via the server of the synchronized content management system, the edit operation from the second client and assigning a new position to the edit operation from the second client;

sending, via the server of the synchronized content management system, the edit operation from the first client to the second client along with instructions to update the position for the edit operation from the second client and instructions to perform the respective transform operations based on the adjustment;

sending, via the server of the synchronized content management system, an update of the edit operation from the second client for insertion at the updated position to the first client and instructions to perform the respective transform operations based on the insertion; and updating, via the server of the synchronized content management system, the ordered list of edit operations for the shared content item based on the edit operations and updates sent to the first client and the second client, wherein at the end of the updating the ordered list of edit operations for the shared content item of the synchronized content management system matches the ordered list of edit operations for the shared content item maintained by each of the first client, the second client, and the server.

14. The non-transitory computer-readable storage medium of claim 13, wherein the shared content item is shared for real-time editing between the first client and the second client, wherein editing includes at least the ability to perform an action and reversing the action.

15. The non-transitory computer-readable storage medium of claim 13, further storing processor-executable instructions for causing the synchronized content management system to store the ordered list of the edit operations received from the first and the second client.

16. The non-transitory computer-readable storage medium of claim 13, further storing processor-executable instructions for causing the synchronized content management system to store the ordered list of the edit operations received from the first and the second client, and wherein the processor uses the ordered list of the edit operations to determine when a received edit operation must be transformed according to a respective transform operation.

17. The non-transitory computer-readable storage medium of claim 13, further storing processor-executable instructions for causing the processor to assign the unique identifiers to the edit operations to define an ordering of the edit operations based on when an edit operation is received at the server in relation to other edit operations.

18. The computer implemented method of claim 1 further comprising:

editing, via the native application on the first client, a first copy of the shared content item stored at a first client device and via the native application on a second client device, a second copy of the shared content item stored at the second client device.

* * * * *